(12) United States Patent
Um et al.

(10) Patent No.: US 7,536,087 B2
(45) Date of Patent: May 19, 2009

(54) METHOD OF MANAGING RECORDED STILL PICTURES ON A RECORDING MEDIUM

(75) Inventors: Soung Hyun Um, Anyang-si (KR);
Kang Soo Seo, Kyunggi-do (KR);
Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 791 days.

(21) Appl. No.: 10/373,101

(22) Filed: Feb. 26, 2003

(65) Prior Publication Data

US 2003/0161617 A1    Aug. 28, 2003

Related U.S. Application Data

(63) Continuation of application No. 10/359,621, filed on Feb. 7, 2003.

(30) Foreign Application Priority Data

Feb. 22, 2002    (KR) .................... 10-2002-0009545

(51) Int. Cl.
*H04N 5/00* (2006.01)
*H04N 7/00* (2006.01)
(52) U.S. Cl. ...................... 386/121; 386/105
(58) Field of Classification Search ............. 386/121, 386/120, 124, 125, 45, 46, 112, 107, 38, 386/442, 105, 106
See application file for complete search history.

(56) References Cited

U.S. PATENT DOCUMENTS

| | | | |
|---|---|---|---|
| 4,794,735 A | | 1/1989 | Batchelder et al. |
| 5,536,060 A | | 7/1996 | Rashid et al. |
| 5,796,428 A | * | 8/1998 | Matsumoto et al. .... 348/207.99 |
| 6,343,832 B1 | | 2/2002 | Queener et al. |
| 6,519,415 B1 | | 2/2003 | Kim et al. |
| 6,560,405 B2 | | 5/2003 | Ando et al. |
| 6,574,419 B1 | | 6/2003 | Nonomura et al. |
| 6,687,453 B1 | | 2/2004 | Sakamoto et al. |
| 6,763,182 B1 | | 7/2004 | Endo et al. |
| 6,778,755 B1 | | 8/2004 | Moon et al. |
| 2002/0012522 A1 | | 1/2002 | Kawakami et al. |
| 2002/0093219 A1 | | 7/2002 | Traister et al. |

(Continued)

FOREIGN PATENT DOCUMENTS

CN           1240293 A         1/2000

(Continued)

*Primary Examiner*—Robert Chevalier
(74) *Attorney, Agent, or Firm*—Birch, Stewart, Kolasch & Birch, LLP

(57) ABSTRACT

The present invention relates to a method of conducting management operations such as deletion, copy, and movement of recorded still pictures recorded on a recording medium. The present method records still pictures onto a recording medium, groups the recorded still pictures based on their attributes, creates a list listing filenames of respective still pictures belonging to each still-picture group, and writes the filename list onto the recording medium. Afterwards, if a deleting or an inter-group moving command is received for a still picture recorded on the recording medium, the present method deletes a filename of the still picture written on the filename list including the filename of the still picture. Such a still picture managing method through a filename list ensures that moving, copying, and deleting operations of numerous recorded still pictures can be conducted easily.

18 Claims, 4 Drawing Sheets

U.S. PATENT DOCUMENTS

2002/0181939 A1* 12/2002 Date et al. .................... 386/95

FOREIGN PATENT DOCUMENTS

| | | |
|---|---|---|
| GB | 2 101 535 A | 1/1983 |
| JP | 10-254746 A | 9/1998 |
| JP | 10-336579 A | 12/1998 |
| JP | 11-275503 A | 10/1999 |
| JP | 2000-67524 A | 3/2000 |
| JP | 2000-134565 A | 5/2000 |
| JP | 2000-333106 A | 11/2000 |
| JP | 2001-022626 A | 1/2001 |
| JP | 2002-44501 A | 2/2002 |
| KR | 2000-0006198 A | 1/2000 |

* cited by examiner

METHOD OF MANAGING RECORDED STILL PICTURES ON A RECORDING MEDIUM

This application is a continuation of co-pending application Ser. No. 10/359,621, filed on Feb. 7, 2003, the entire contents of which are hereby incorporated by reference and for which priority is claimed under 35 U.S.C. § 120; and this application claims priority of Application No. 2002-0009545 filed in Korea on Feb. 22, 2002 under 35 U.S.C. § 119.

BACKGROUND OF THE INVENTION

1. Field of the Invention

The present invention relates to a method of conducting management operations such as deletion, copy, and movement of still pictures recorded on a recording medium.

2. Description of the Related Art

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is in progress.

Recently, a Digital Still Camera (DSC) being capable of storing a taken picture in digital data has been developed. Such a DSC usually has a memory chip of large storage capacity so that it can take high-quality pictures and store audio data associated with the stored pictures as well. In a DSC, the taken pictures are encoded in the format of JPEG, or TIFF while the audio data are done in the format of PCM, u-Law PCM, or IMA-ADPCM.

A DSC has a well-known file system called 'DCF' (Design rule for Camera File system) for recording still pictures and audio data. FIG. 1 shows an illustrative DCF. In the structure of DCF, a DCIM (Digital Camera IMages) directory exists under a root directory and many subdirectories may exist under the DCIM. Each subdirectory has 8-digit-long filename that is composed of three numeric digits and five character digits. The three numeric digits should be unique, for instance, one among 100~999, and the five character digits are arbitrarily chosen by a user. Because the three numeric digits are unique the subdirectories can be created up to 900.

A subdirectory, e.g., subdirectory '100ABCDE' of FIG. 1 can accommodate many data files of which filename is 8-digits long. The filename is composed of four numeric digits and four character digits. While the four character digits are chosen by a user the four numeric digits should be unique among data files if their attributes are different. The data files are still pictures and/or audio files, respectively. The still picture files have extension of 'JPG' or 'TIF' while the audio files encoded by PCM, u-Law PCM or IMA-ADPCM have extension of 'WAV'. The filenames of the data files can be same if their extensions are different. Therefore, when a picture file is to be dubbed with audio, a dubbed audio file can be linked with the picture file only if their filenames are made same.

By the way, a digital video recorder (DVR) records video and audio data in a file structure shown in FIG. 2. The file structure of FIG. 2 has a DVR directory under a root directory. The DVR directory includes a menu file 'menu.tdat', a mark file 'mark.tdat', and their index files 'menu.tidx' and 'mark.tidx'. The menu and the mark file have menu data and mark data respectively and the index files have search data to index menu and mark data in the menu and the mark file.

The 'DVR' directory is mandatory for motion picture recording of a DVR. The 'DVR' directory has directories 'PLAYLIST', 'CLIPINF', and 'STREAM'. The 'PLAYLIST' directory includes playlist files (*.rpls,*.vpls) containing motion-picture and still-picture play items and title management information. The directory 'CLIPINF' includes clip information files (*.clpi) containing information on movie stream management and movie attribute and the directory 'STREAM' includes stream files (*.m2ts) containing actual motion-picture data stream packets.

However, it is obvious that many still pictures under the file system of FIG. 1 obtained with a DSC are moved to a recording medium of very large capacity because of relatively small storage capacity of a DSC. That is, numerous still pictures taken by a DSC will be recorded onto a large-capacity recording medium through a DVR being capable of recording data onto that medium. This fact strongly demands a DVR to use an efficient still-picture management method.

SUMMARY OF THE INVENTION

It is an object of the present invention to provide a method that creates a list to group recorded still pictures on a recording medium and manages the recorded files through the list.

A method of managing a still picture recorded on a recording medium in accordance with the present invention is characterized in that it comprises the steps of: recording still pictures onto a recording medium, and grouping the recorded still pictures based on their attributes; and creating a list listing filenames of respective still pictures belonging to each still-picture group, and writing the filename list onto the recording medium.

Another method of managing a still picture recorded on a recording medium in accordance with the present invention is characterized in that it comprises the steps of: receiving a deleting or an inter-group moving command for a still picture recorded on a recording medium; and deleting a filename of the still picture written on a filename list including the filename of the still picture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 3 is a block diagram of a disk device which a method of managing still pictures recorded on a rewritable recording medium in accordance with the present invention is embedded in.

DETAILED DESCRIPTION OF THE PREFERRED EMBODIMENT

In order that the present invention may be fully understood, a preferred embodiment thereof will now be described with reference to the accompanying drawings.

Figure 3:
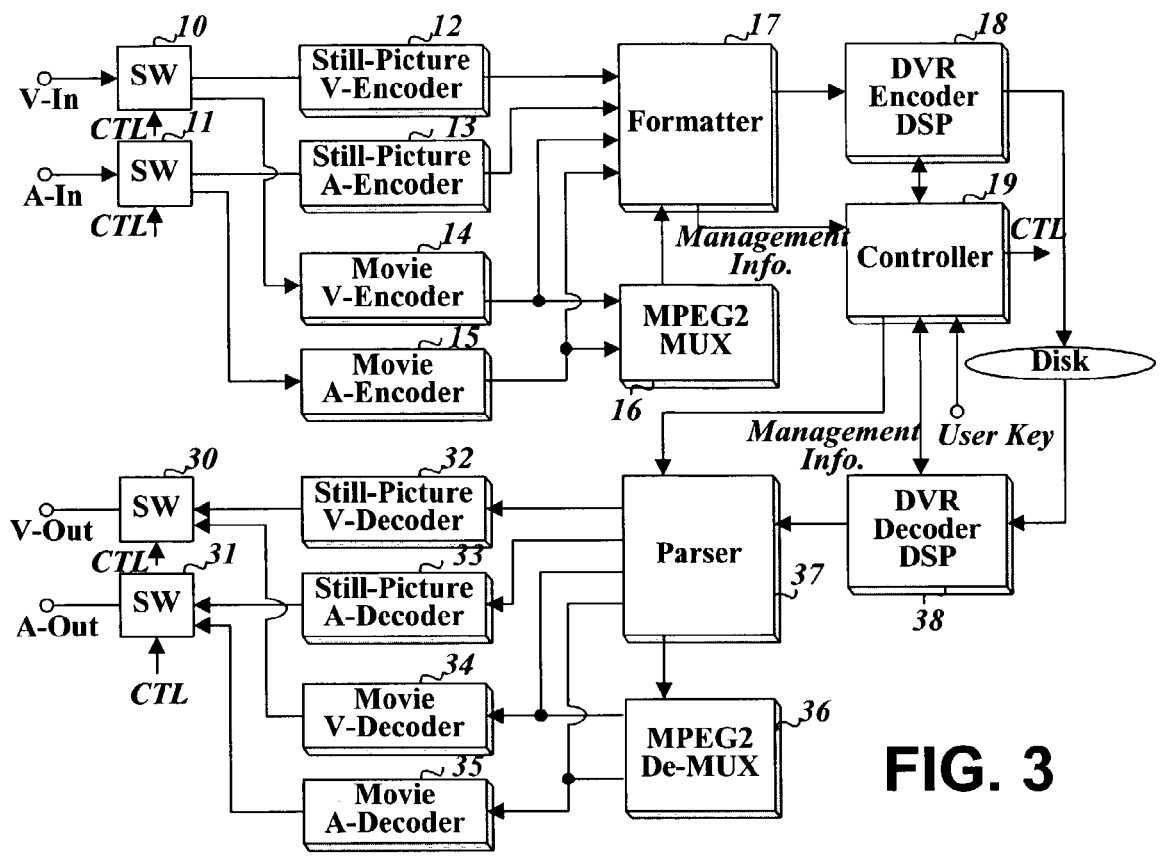

FIG. 3 is a block diagram of a disk device which a method of managing still pictures recorded on a rewritable recording medium in accordance with the present invention is embedded in.

The disk device of FIG. 3, e.g., a DVR can record video/audio data and management information for searching and reproduction control onto a rewritable recording medium.

The disk device comprises, as shown in FIG. 3, an input processing module, an output processing module, and a controller 19 conducting overall system control. The input processing module is composed of two input switching units 10 and 11, a still picture video 12 and a still picture audio encoder 13, a movie video 14 and a movie audio encoder 15, an MPEG 2 muxer 16, a formatter 17, and a DVR encoding DSP 18 while the output processing module is composed of two output switching units 30 and 31, a still picture video 32 and a still picture audio decoder 33, a movie video 34 and a movie audio decoder 35, an MPEG 2 demuxer 36, a parser 37, and a DVR decoding DSP 38.

The two input switching units 10 and 11 selectively connect their input signals to the still picture video 12 and the still picture audio encoder 13 or the movie video 14 and the movie audio encoder 15 in response to a switching control 'CTL' of the controller 19. The still picture encoders 12 and 13 encode video data from the first switching unit 10 to JPEG or TIFF format and audio data from the second switching unit 11 to PCM, u-Law PCM, or IMA-ADPCM format, respectively as a DSC does.

The movie encoders 14 and 15 encode video data from the first switching unit 10 to MPEG 2 format and audio data from the second switching unit 11 to AC-3, MPEG 1 layer 2, or LPCM format, respectively. The MPEG 2 muxer 16 multiplexes the encoded video and audio data from the movie video 14 and the movie audio encoder 15 to produce MPEG 2 stream that is directed to the formatter 17.

For motion-picture input, a user can set a still-picture recording mode that is supported by a DVR. In that mode, MPEG2-formatted video data and AC3-, MPEG1 layer2-formatted, or LPCM audio data from the movie video 14 and the movie audio encoder 15 are applied to the formatter 17 directly not passing through the MPEG 2 muxer 16. The formatter 17 is able to convert each frame of motion pictures to still picture.

In case that the encoded still picture video and audio data are inputted from the still picture encoders 12 and 13, the formatter 17 segments or groups input data to yield successive data units, adds necessary head information to each data unit, and transmits them sequentially to the DVR encoding DSP 18. The data unit has a size suitable for a recording unit area of a rewritable recording disk. Furthermore, the formatter 17 produces management information for searching for and controlling reproduction of the re-sized still picture video and audio data. The produced management information is delivered to the controller 19.

The formatter 17 also conducts the same resizing and management information creating operation for the still-picture video and audio data that are converted from motion picture data as explained before.

In case that the encoded motion picture video and audio data are inputted from the movie encoders 14 and 15 and the MPEG 2 stream are from the MPEG 2 muxer 16 at the same time, the formatter 17 selects the encoded data or the MPEG 2 stream to segment or group the selected data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized motion picture video and/or audio data. The produced management information is delivered to the controller 19.

The DVD encoding DSP 18 constructs ECC (Error Correction Code) blocks with the successive data units having still or motion pictures, thumbnails and audio data and then modulates data of ECC blocks to corresponding recording waveforms that will form mark/space patterns on the surface of the rewritable recording disk. At this time, the controller 19 creates management information to group still pictures and associated audio data or thumbnails. The group is determined based on attribute or subject of data objects, namely still pictures and/or audio data.

The management information includes lists created in association with respective still picture group. Each list contains filenames of still pictures that are assigned to an associated group.

Figure 1:
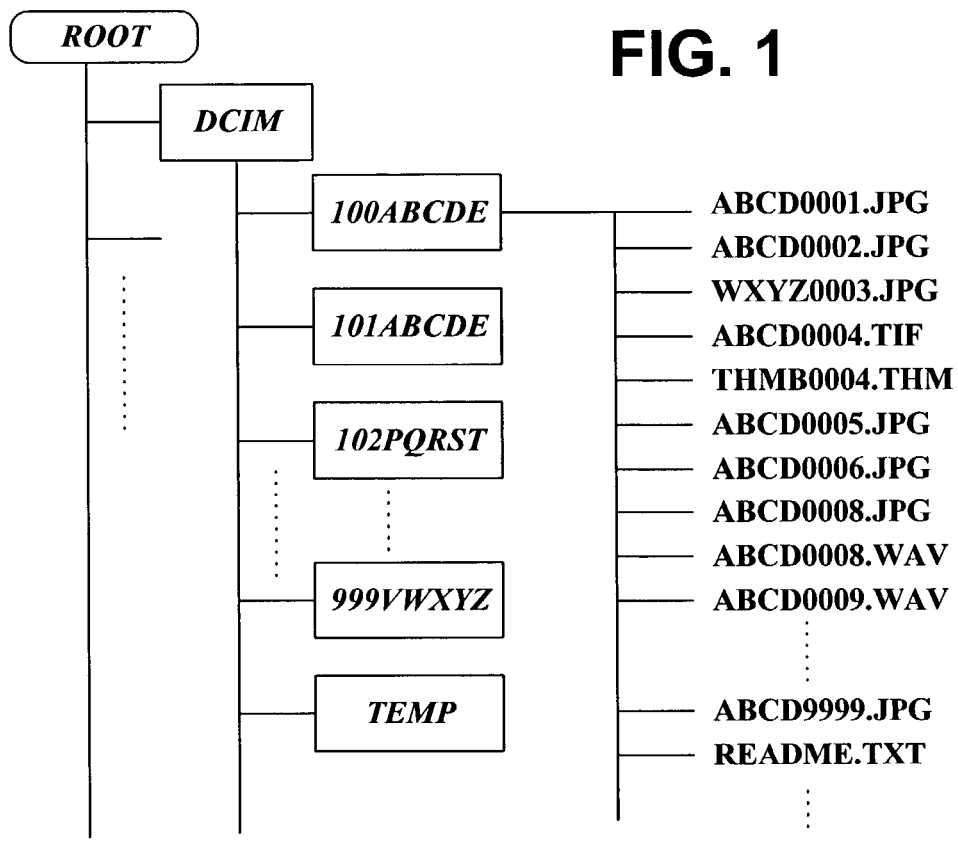
FIG. 1 shows an illustrative DCF (Design rule for Camera File system) adopted by a digital still camera.
Figure 2:
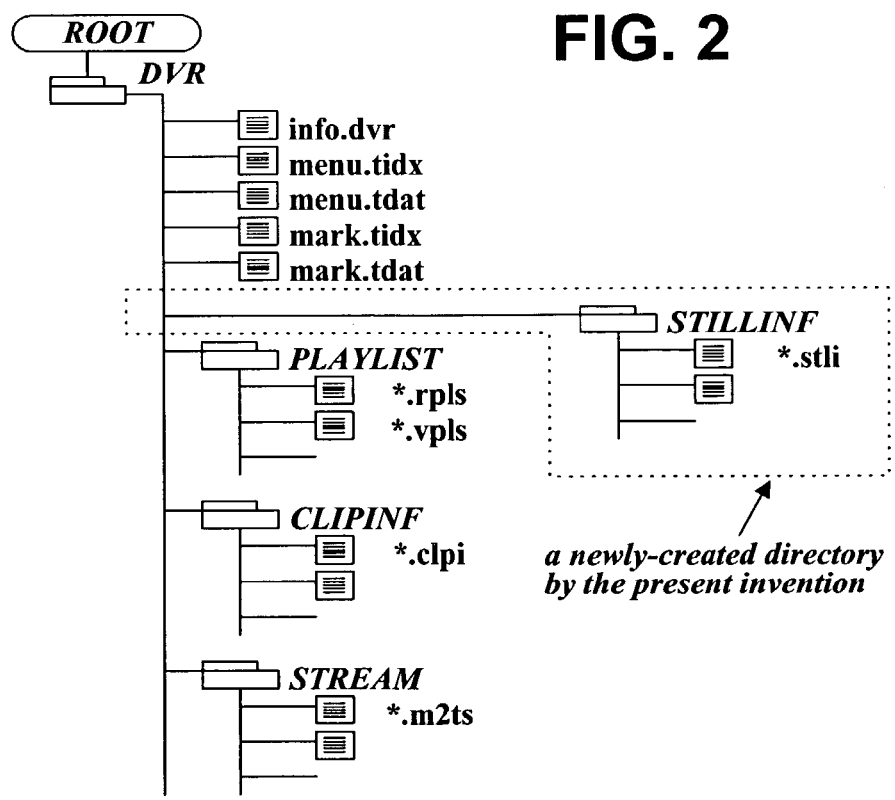
FIG. 2 shows an illustrative file system adopted by a digital video recorder.

The created group management information is written in a still-picture information file (*.stli) under a directory 'STILLINF' that is newly defined by the present invention as shown in FIG. 2. And, additional information related with management of still picture groups (SPGs) is created and written in navigation data fields defined for a DVR.

In addition, while or after video and/or audio data are recorded, the controller 19 records the management information received from the formatter 17 or created by itself onto the rewritable recording disk through the DVR encoding DSP 18.

The above-explained recording process and a still-picture managing method conducted thereafter are explained below in detail.

Figure 4:
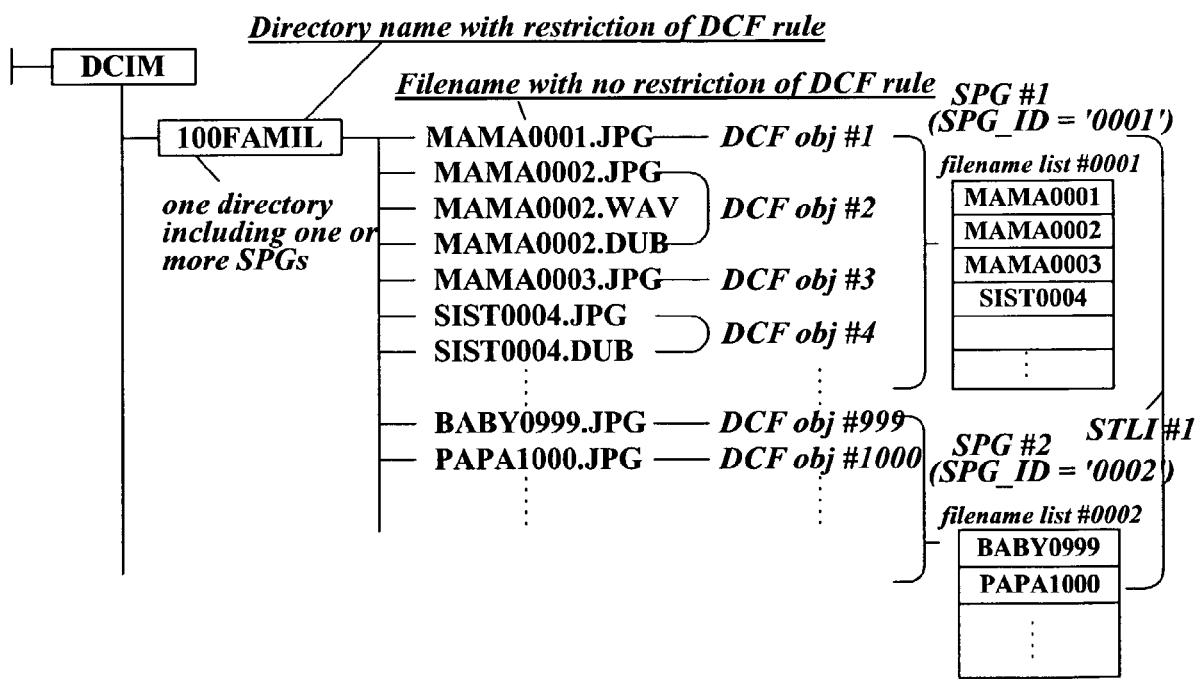
FIGS. 4 to 8 show a schematic still-picture recording/grouping process and group management information related with still picture managing in accordance with the present invention.

FIGS. 4 to 8 show a schematic still-picture recording/grouping process and group management information related with still picture managing in accordance with the present invention. In this embodiment, the controller 17 records still pictures, and associated audio data and thumbnails, etc. in the DCF structure adopted by a DSC, as shown in FIG. 4. At this time, still pictures and associated audio data and thumbnails with same attribute are designated to a single SPG. At this time, a filename list is created for the single SPG. A directory and a data file are named under the naming rule of DCF or arbitrarily by a user with no restriction except a DCF object sub-rule.

Explaining the recording example of FIG. 4, the directory '100FAMIL' includes a still picture file 'MAMA0001.JPG', another still picture file 'MAMA0002.JPG', and a real-time audio file 'MAMA0002.WAV' and a dubbed audio file 'MAMA0002.DUB' associated with the file 'MAMA0002.JPG'. According to the DCF object sub-rule, a file or files with same filename constitute a single DCF object, so that the first DCF object consists of only the file 'MAMA0001.JPG' while the second DCF object consists of three files 'MAMA0002.JPG', 'MAMA0002.WAV' and 'MAMA0002.DUB'.

The files 'SIST0004.JPG' and 'SIST0004.DUB' constitute the fourth DCF object, as shown in FIG. 4. Because a filename list is created for each SPG, the files belonging to a same SPG need not include a common string in their filenames.

Therefore, a group identifier uses a number, e.g., 4 digits not related with any filename of data files belonging to the concerned SPG.

In the recording example of FIG. 4, the first SPG uses a serial number '0001' as group identifier and the second uses '0002'. The group identifying number is used to specify a filename list among many lists.

Figure 5:
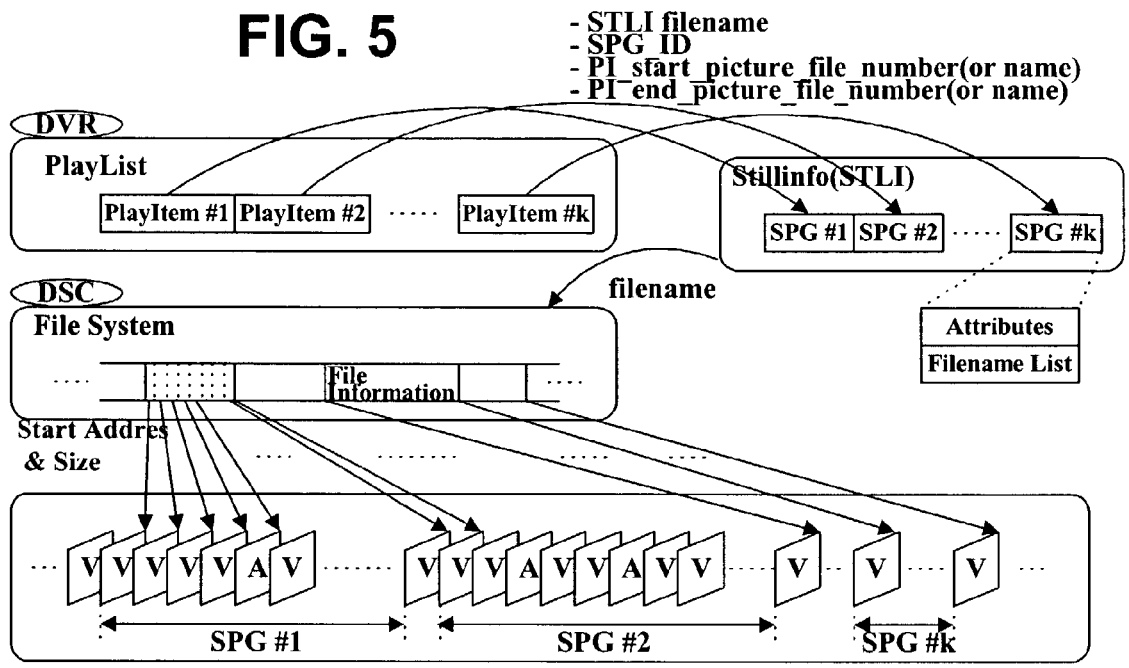

The filename list and attribute information for each SPG are written a still-picture information file (*.stli) under the directory 'STILLINF', as shown in FIG. 5.

The filename to be written in a filename list is a filename identifying a DCF object (a collection of a still picture, and an associated audio file, etc.). Needless to say, the filename to be written in a filename list is a filename of a still picture if a DCF object consists of only a still picture. A file number to identify a data file can be written in a filename list instead of filename.

A playlist file (*.rpls,*.vpls) defining presentation order of data files includes playitems. Each playitem is linked to a SPG through a group identifier written therein. Each playitem can include, as its member, a filename of still-picture information file (*.stli), and a start and an end picture file number (or filename) besides the group identifier.

Figure 6:
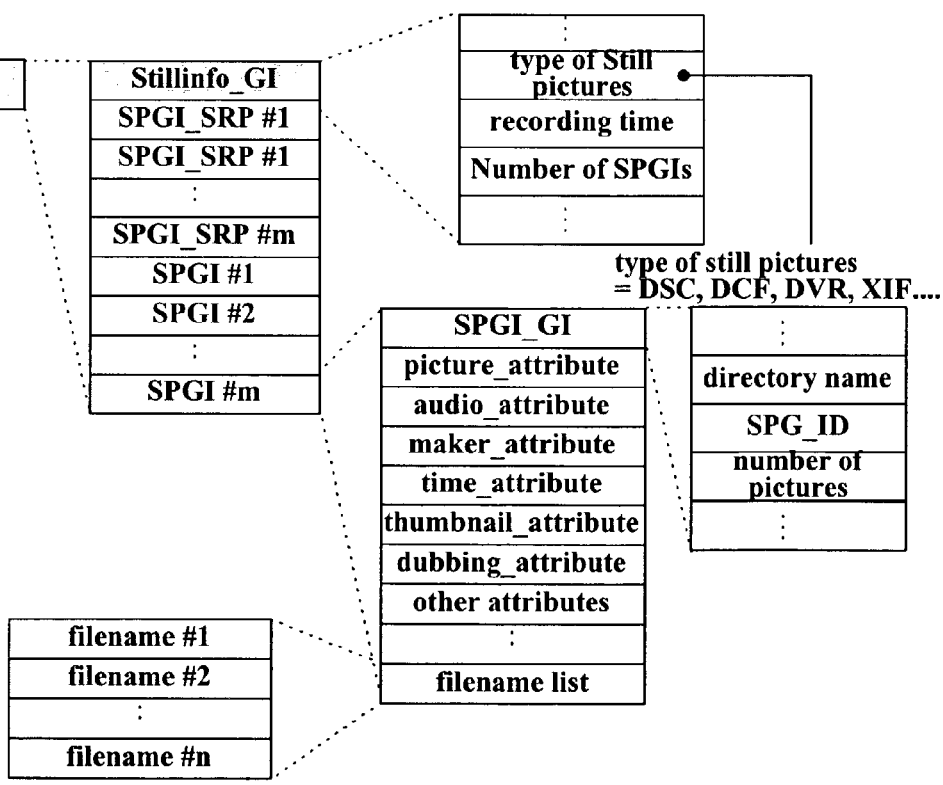

The still-picture information file (*.stli) is structure as shown in FIG. 6. The still-picture information file is composed of general information of still-picture information 'Stillinfo_GI', a plurality of SPG information search pointers 'SPGI_SRP #k', and plural pieces of SPG information 'SPGI #k'. The general information of still-picture information 'Stillinfo_GI' includes type of still pictures, recording time, the number of SPGIs, and so on.

Each SPGI, pointed by a SPG information search pointer, includes SPGI general information, the aforementioned filename list, and an attribute table where respective attributes of picture, audio, maker, time, thumbnail, dubbed audio, and others are written.

The picture attribute includes a coding mode (JPEG/TIFF/MPEG), an aspect ratio (4:3/16:9), a YCrCb sampling rate (4:2:2/4:2:0), a resolution (HDTV:1920×1080/SXGA:1280× 960/XGS:1024×768/ . . . ), and the audio attribute includes a coding mode (PCM/IMA-ADPCM/AC-3/MPEG1-L2), a sampling rate (8 kHz/11.025 kHz/48 kHz/96 kHz/ . . . ), the number of channels (1/2/4/5.1/ . . . ), and a quantization level (8/16/24bits).

The maker attribute includes manufacturer's code (LG/Samsung/MEI/ . . . ), a model name, and a recording source, and the time attribute includes original creation time, etc. The thumbnail attribute is almost similar to the picture attribute and the dubbed audio attribute is almost similar to the audio attribute as well. The other attribute includes important attributes defined in EXIF and DCF format.

The SPGI general information 'SPGI_GI' includes a directory name where a SPG is, a SPG identifier 'SPG_ID', the number of pictures, and so forth.

Using the above-explained management information including filename lists related with SPGs, SPGI 'SPGI #i' is identified in the still-picture information file (*.stli) through a SPG identifier 'SPG_ID' of a playitem selected from a playlist, and then still pictures (or DCF objects further including audio data files, etc.) are presented sequentially in order that they are listed on the filename list of that SPGI.

Every data file listed on a filename list is found through a file system adopted by a disk device.

Figure 7:
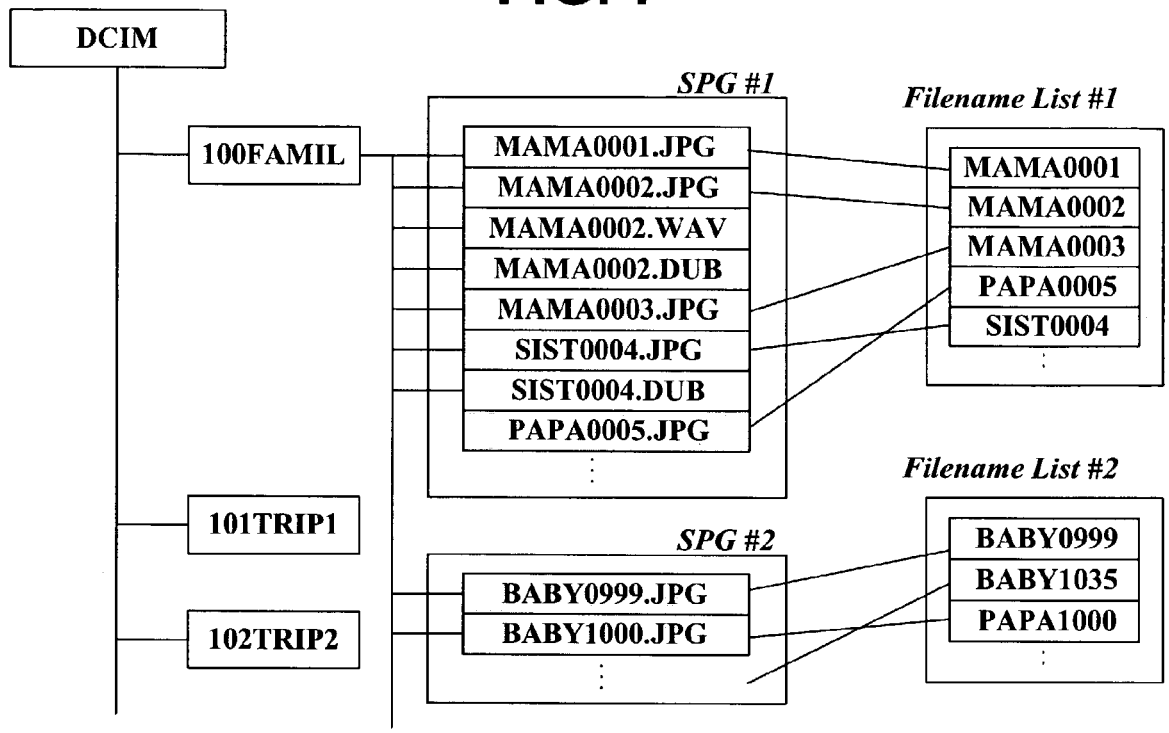

If a user requests to change presentation sequence of still pictures, the controller 19 changes filename-written order on a filename list of a concerned SPG in accordance with user's request as shown in FIG. 7.

If a file deletion is requested by a user, the controller 19 deletes a concerned filename on a filename list without deleting that data file. The data file whose filename has been deleted in the filename list is not presented when a SPG including the data file is presented.

Figure 8:
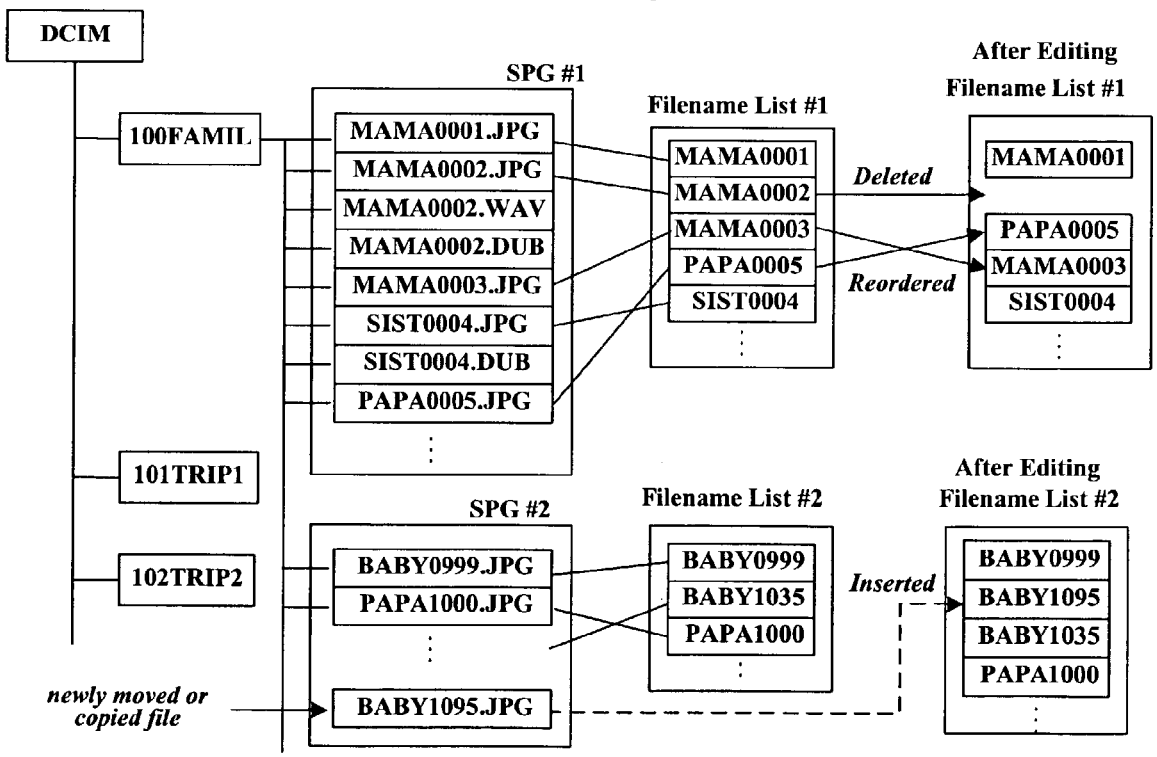

FIG. 8 illustrates an editing example that, in the first SPG, the presentation sequence between the DCF objects 'PAPA0005' and 'MAMA0003' have been changed and the DCF object 'MAMA0002' has been deleted in the presentation list.

If a user requests movement or copy of a still picture (or a DCF object) to other SPG, its filename is, in case of movement, deleted in a filename list of a previous SPG, as explained before, and is inserted in a proper entry position of a filename list of a target SPG. The entry position to be inserted is equivalent to a presentation order of the moved or copied still picture (or DCF object). FIG. 8 illustrates, in the second SPG, that the DCF object 'BABY1095' is newly added to the second SPG and its presentation order is next to the object 'BABY0999'.

For conducting user's request of presentation sequence change, a user-defined filename list can be created additionally. In this case, when a user changes presentation sequence, concerned filenames are moved and/or deleted on the additional user-defined filename list while an original filename list in the SPGI is not altered.

Needless to say, the above-explained still-picture managing method through a filename list is applicable to a disk device structured differently from the disk device of FIG. 3.

The above-explained still-picture managing method through a filename list has an advantage that moving, copying, and deleting operations of numerous recorded still pictures can be conducted easily.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of recording a still picture and associated audio data onto a recording medium, comprising the steps of:
 (a) recording still pictures onto the recording medium, and grouping the recorded still pictures based on their attributes information;
 (b) creating management information segments, each of the segments having one-to-one relationship with each still-picture group, and writing the management information segments onto the recording medium,
 wherein the management information segment includes a name of a file that includes the recorded still pictures, and the attribute information of the still pictures for the corresponding still-picture group, and
 wherein the management information segment is created for each play item being a sub unit of a play list which defines a playback sequence of the recorded still pictures and associated audio data, and
 wherein the playback sequence of the still picture is conducted by retrieving the play item in the play list; and (c) recording the associated audio data onto the recording medium, wherein the associated audio data are recorded into a separated file different from the file in which the still pictures are recorded.

2. The method of claim 1, wherein the recorded still pictures are named under the rule of DCF (Design rule for Camera File system) adopted by a DSC (Digital Still Camera), and are recorded under a directory that is named under the rule of DCF.

3. The method of claim 2, wherein each directory includes at least one still-picture group.

4. The method of claim 1, wherein said management information segment includes a group identifier for each still-picture group.

5. The method of claim 1, wherein said management information segments include access information and attribute information for each still-picture group, and is written in a still-picture information file and/or in a play item included in a playlist that is specified by a digital video recorder.

6. The method of claim 5, wherein said access information includes a filename list where filenames of still pictures are written.

7. The method of claim 5, wherein said access information includes a name or pathname of a directory which a still-picture group is recorded under.

8. The method of claim 1, wherein management information of the management information segments includes the number of total still-picture groups.

9. The method of claim 1, wherein the recorded still pictures are named regardless of the rule of DCF (Design rule for Camera File system) adopted by a DSC (Digital Still Camera), but are recorded under a directory that is named under the rule of DCF.

10. The method of claim 9, wherein each directory includes a single still-picture group.

11. The method of claim 9, wherein each directory includes at least one still-picture group.

12. The method of claim 1, wherein the still-picture group further includes an audio data file and/or a thumbnail file associated with a still picture.

13. The method of claim 12, wherein the audio data file and/or the thumbnail file has the same filename that an associated still picture file has.

14. The method of claim 1, wherein said attribute information includes a coding mode, an aspect ratio, a YCrCb sampling rate, and/or a resolution of a still picture, and a coding mode, a sampling rate, the number of channels, and/or a quantization level of audio data associated with the still picture.

15. A computer-readable recording medium embodied with management information to control a recording or reproducing operation of the recording medium, comprising:
a first area to record at least one still picture in a unit the recording medium, wherein said at least one still picture in the unit shares attribute information;
a second area to record management information segments, each of the segments having one-to-one relationship with each unit,
wherein the management information segment includes a name of a file that includes the recorded still pictures, and the attribute information of the still pictures, and
wherein the management information segment is created for each play item being a sub unit of a play list which defines a playback sequence of the recorded still pictures and associated audio data, and
wherein the playback sequence of the still picture is conducted by retrieving the play item in the play list; and
a third area to record the audio data associated with the still pictures, wherein the associated audio data are recorded into a separated file different from the file in which the still pictures are recorded.

16. A method of recording a still picture and associated audio data onto a recording medium, comprising:
(a) recording at least one still picture in a unit of the recording medium, wherein said at least one still picture in the unit shares attribute information;
(b) creating management information segments, each of the segments having one-to-one relationship with each unit, and writing the management information segments onto the recording medium,
wherein the management information segment includes a name of a file that includes the recorded still pictures, and the attribute information of the still pictures, and
wherein the management information segment is created for each play item being a sub unit of a play list which defines a playback sequence of the recorded still pictures and associated audio data, and
wherein the playback sequence of the still picture is conducted by retrieving the play item in the play list; and
(c) recording the associated audio data onto the recording medium, wherein the associated audio data are recorded into a separated file different from the file in which the still pictures are recorded.

17. A method of reproducing a still picture and associated audio data from a recording medium, the recording medium including (a) at least one still picture recorded in a unit of the recording medium, wherein the at least one still picture in the unit shares attribute information, (b) management information segments recorded on the recording medium, each of the segments having one-to-one relationship with each unit, wherein the management information segment includes a name of a file that includes the recorded still pictures, and the attribute information of the still pictures, and wherein the management information segment is created for each play item being a sub unit of a play list which defines a playback sequence of the recorded still pictures and associated audio data, and wherein the playback sequence of the still picture is conducted by retrieving the play item in the play list, and (c) the associated audio data recorded on the recording medium, wherein the associated audio data are recorded into a separated file different from the file in which the still pictures are recorded, the method comprising:
reproducing the still picture data and the associated audio data from the recording medium using the management information segments.

18. The method of claim 1, wherein each still-picture group has the same attribute information for all the still pictures in that still-picture group.

* * * * *